United States Patent
Sanchez

Patent Number: 5,855,925
Date of Patent: Jan. 5, 1999

[54] SHOE MOLDING APPARATUS

[76] Inventor: Jose Garcia Sanchez, Benito Perez Galdo No.53, 3era., Planta, Elche(Alicante), Spain, 03201

[21] Appl. No.: 961,676

[22] Filed: Oct. 31, 1997

[51] Int. Cl.$^6$ .................................................. B29D 31/50
[52] U.S. Cl. ...................... 425/129.2; 249/102; 425/183
[58] Field of Search ............................... 425/119, 129.2, 425/183; 249/102, 156; 264/244

[56] References Cited

U.S. PATENT DOCUMENTS

| | | | |
|---|---|---|---|
| 2,919,463 | 1/1960 | Creamer | 425/119 |
| 3,303,532 | 2/1967 | Ludwig | 425/129.2 |
| 3,350,748 | 11/1967 | McIlvin | 425/119 |
| 3,677,679 | 7/1972 | Christie et al. | 425/119 |
| 3,840,310 | 10/1974 | Klee et al. | 425/119 |
| 4,556,191 | 12/1985 | Mangogna | 264/244 |
| 4,778,368 | 10/1988 | Rebers et al. | 425/183 |

*Primary Examiner*—Robert Davis
*Attorney, Agent, or Firm*—J. Sanchelima

[57] ABSTRACT

A plastic injection apparatus for making shoes that includes one molding block composed of two halves that define a cooperative cavity for forming the sole of the shoe and two shoe molds of different contiguous sizes. The cavity includes an inwardly extending peripheral flange at its upper edge. The shoe molds have such dimensions that an adjusting peripheral line is defined around each one of the shoe molds of such dimensions that when both shoes are placed in the molding block, the flange is brought adjacent to the adjusting peripheral line.

1 Claim, 1 Drawing Sheet

SHOE MOLDING APPARATUS

BACKGROUND OF THE INVENTION

1. Field of the Invention

The present invention relates to a plastic injection molding apparatus to make shoes.

2. Description of the Related Art

Conventional methods for making shoes typically require one molding block for each shoe designs to be made. A vulcanization or plastic injection mold is made for each shoe size. However, there are no apparatuses in the prior art wherein a molding block is used for two consecutive shoe sizes. The advantages in cost reduction and inventory logistics are quite apparent.

SUMMARY OF THE INVENTION

It is one of the main objects of the present invention to provide a shoe molding apparatus that permits a user to make shoes of two consecutive shoe sizes with the same molding block.

It is another object of this invention to minimize the cost of manufacturing shoes and to reduce the inventory requirements.

It is another object of this invention to provide such an apparatus that is inexpensive to practice while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
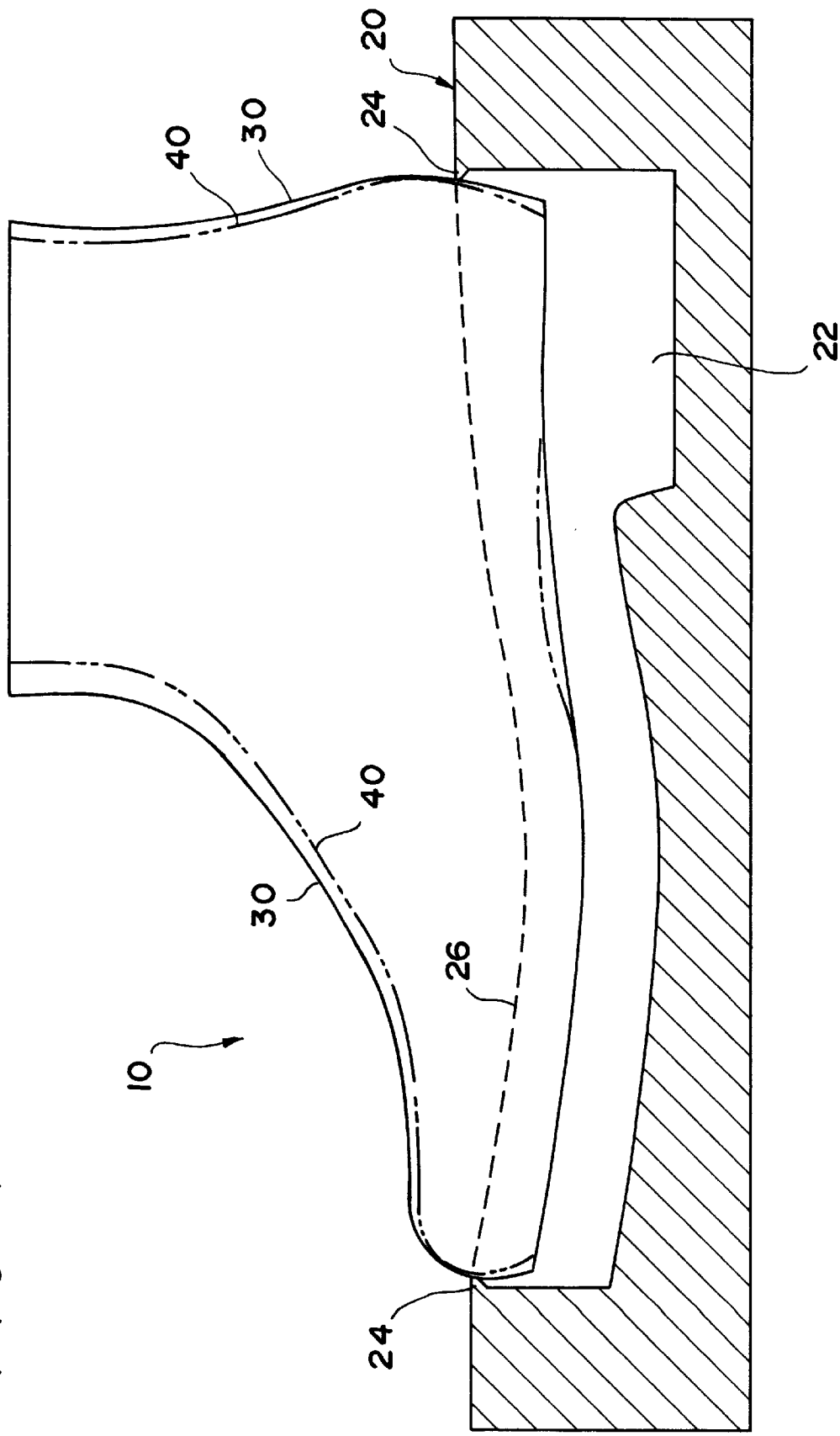
FIG. 1 is an elevational cross-sectional view of a molding block with a shoe mold mounted therein and a smaller shoe size mold in phantom.

Referring now to FIG. 1 in the drawing, where the present invention is generally referred to with numeral 10, it can be observed that it basically includes molding block 20 with cavity 22 wherein shoe molds 30 and 40 are partially housed.

As is known in the shoemaking industry, molding block 20 has two halves defining cavity 22 with inwardly extending upper flange 24 on the periphery of cavity 22. Adjusting peripheral line 26 marks the upper level of the molding material (plastic) injected inside cavity 22, in order to make the shoe sole.

In the preferred embodiment, shoe mold 30 is a half size bigger that shoe mold 40. However, both shoe molds 30 and 40 have a common peripheral dimension defining adjusting peripheral line 26. When either shoe mold 30 or shoe mold 40 is partially housed in molding block 20, adjusting peripheral line 26 is brought next to flange 24 in both sizes. Thus, with only one molding block 20 a user can make shoes of two different contiguous sizes. The projection of the sole is the same but the dimensions of the sole inside are different to comply with the different size dimensions.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A plastic injection molding apparatus for making shoes comprising:

A) a molding block having two halves defining a cavity in between and when brought against each other and said cavity having a peripheral flange at its upper edge that extends inwardly; and B) first and second shoe molds of different consecutive sizes and defining an adjusting peripheral line that is common in both so that when said first and second shoe molds are placed in said cavity and partially housed within said cavity, said peripheral flange is positioned along said adjusting peripheral line thereby permitting a user to make shoes of two different contiguous sizes with one molding block.

* * * * *